United States Patent
Danzer et al.

(10) Patent No.: US 7,261,969 B2
(45) Date of Patent: Aug. 28, 2007

(54) FUEL CELL HAVING A PERFORATED FOIL DISTRIBUTING THE FUEL GAS OVER THE ELECTRODE SURFACE

(75) Inventors: Maximilian Danzer, Scheyern (DE); Franz-Josef Wetzel, Gernlinden (DE); Xiaofeng Yan, Leonberg-Warmbronn (DE); Thomas Hoefler, Munich (DE); Bernd Kuhn, Echterdingen (DE); Andreas Oswald Stoermer, Tuntenhausen (DE); Olav Finkenwirth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 193 days.

(21) Appl. No.: 11/063,620

(22) Filed: Feb. 24, 2005

(65) Prior Publication Data

US 2005/0175884 A1 Aug. 11, 2005

Related U.S. Application Data

(63) Continuation of application No. PCT/EP03/07307, filed on Jul. 8, 2003.

(30) Foreign Application Priority Data

Aug. 24, 2002 (DE) ............................... 102 38 860

(51) Int. Cl.
*H01M 8/04* (2006.01)

(52) U.S. Cl. ............................... 429/39; 429/38

(58) Field of Classification Search .................... None
See application file for complete search history.

(56) References Cited

U.S. PATENT DOCUMENTS

| 5,840,438 | A | * | 11/1998 | Johnson et al. ............... 429/30 |
| 6,071,636 | A | | 6/2000 | Mosdale |
| 2002/0048700 | A1 | | 4/2002 | Virkar et al. |
| 2002/0094470 | A1 | | 7/2002 | Wilkinson et al. |

FOREIGN PATENT DOCUMENTS

| DE | 43 40 153 C1 | 11/1993 |
| DE | 198 53 911 A1 | 11/1998 |
| WO | WO 00/08703 | 2/2000 |

* cited by examiner

*Primary Examiner*—Jonathan Crepeau
(74) *Attorney, Agent, or Firm*—Crowell & Moring LLP

(57) ABSTRACT

A fuel cell includes a cathode-electrolyte-anode unit, and a perforated foil structure distributes fuel gas over an electrode surface thereof. Longitudinal axes of at least some of the holes forming perforations in the foil are inclined differently relative to the foil surface such that, near a fuel gas feed, the outlet openings of the holes facing the electrode are oriented at least slightly toward the area of the fuel gas outlet from the fuel cell. Near a fuel gas outlet, the inlet openings of the holes facing the electrode are oriented at least slightly to the area of the fuel gas feed. However, holes whose inlet openings facing away from the electrode are oriented toward the fuel gas feed, and holes whose outlet openings facing away from the electrode are oriented toward the fuel gas outlet, may also be arranged alternately side-by-side.

5 Claims, 1 Drawing Sheet

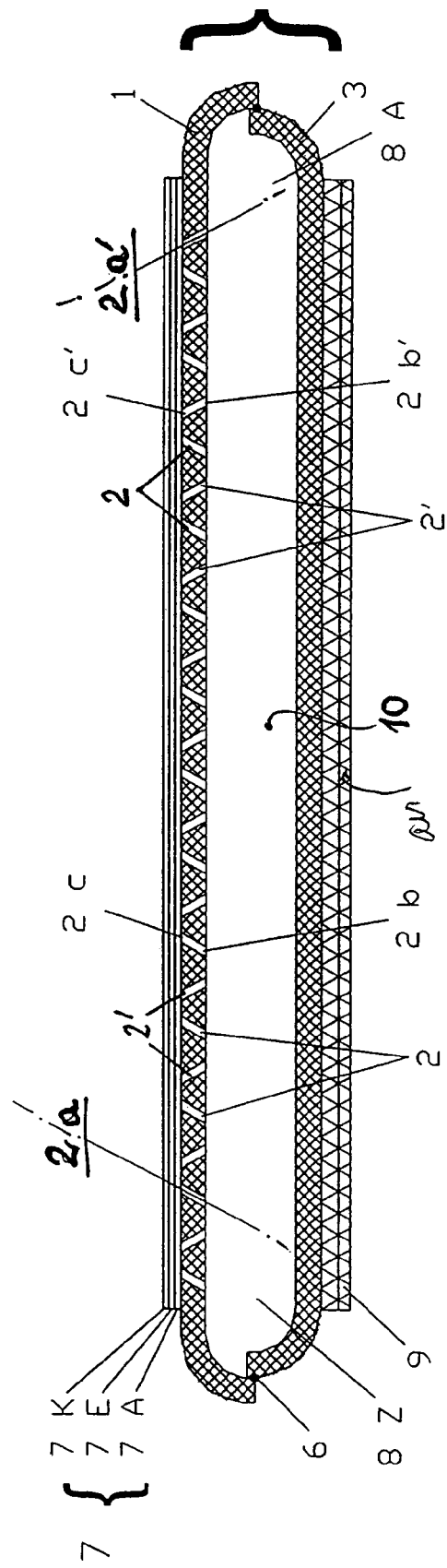

FUEL CELL HAVING A PERFORATED FOIL DISTRIBUTING THE FUEL GAS OVER THE ELECTRODE SURFACE

CROSS-REFERENCE TO RELATED APPLICATIONS

This application is a continuation of PCT Application No. PCT/EP2003/007307 filed on Jul. 8, 2003 (08.07.2003), which claims priority to German Application No. 102 38 860.1 filed Aug. 24, 2002.

BACKGROUND AND SUMMARY OF THE INVENTION

The invention relates to a fuel cell which includes, in addition to a cathode-electrolyte-anode unit, a structure which distributes fuel gas over the electrode surface, with the surface of the structure facing the electrode being formed by a perforated foil.

German Patent Document DE 43 40 153 C1, for example, discloses a solid oxide fuel cell (SOFC) of the generic type, in which, in addition to an independently prefabricated cathode-electrolyte-anode unit, an independent intermediate layer is provided between the electrodes and the bipolar plates or separating plates (known to a person skilled in the art). This independent intermediate layer is constructed as an electrically conductive, elastic and gas-permeable "contact cushion" with a deformable surface structure. The so-called cushion filling may be a highly elastic metallic tissue, and the cushion cover may, for example, be a perforated metal sheet. The purpose of the contact cushion is to provide an optimal electrical contact of the electrodes, while a less exact surface quality of, for example, the anodes and cathodes is acceptable, without impairing electrical contacting within the fuel cell or fuel cell stack constructed of several individual fuel cells.

An essential criterion for an optimal fuel cell function, however, is not merely a sufficient electrical contact of the individual cell elements, but in addition a good flow of fuel gas (or "working gas") onto the fuel cell electrodes. A good flow of oxygen or ambient air is almost equally important.

One object of the present invention to provide an improved fuel cell which, in addition to a cathode-electrolyte-anode unit, has a structure for distributing the fuel gas over the electrode surface, with the surface of the structure facing the electrode being formed by a perforated foil.

This and other objects and advantages are achieved by the fuel cell structure according to the invention, in which the longitudinal axes of at least some holes or passage openings forming the perforation of the perforated foil are inclined with respect to the foil surface.

With regard to operation of the fuel cell, it is extremely advantageous for the oncoming flow direction of the fuel gas or of the air-oxygen toward the respective electrode to extend at least partially diagonally with respect to the electrode surface, in order to ensure a good substance supply to the electrode. Therefore, according to the invention, the longitudinal axes of holes or passage openings which form the perforation in the above-mentioned (known) foil (on whose surface an electrode of the fuel cell rests) are inclined with respect to the foil surface.

According to a feature of the invention, the longitudinal axes of at least some of the holes or passage openings forming the perforation may be inclined differently with respect to the foil surface, depending on the point at which the holes or passage openings are situated with respect to the fuel cell or the fuel gas flow carried therein. Thus, on the side nearest the fuel gas inlet or feed into the fuel cell, the outlet openings of the hole facing the electrodes may, as a matter of priority, be oriented at least slightly toward the side of the fuel gas outflow from the fuel cell, so that a targeted fuel gas flow occurs also along the electrode surface and the fuel gas is therefore relatively uniformly distributed over the electrode surface. In the same sense, on the side nearest the fuel gas outflow from the fuel cell, the inlet openings of the hole or passage openings which face the electrode (virtually leading away the burnt gas or the reaction products from the electrode) as a matter of priority, may then be oriented at least slightly toward the side of the fuel gas inflow (=fuel gas feed) into the fuel cell. In this fashion, the gas can optimally enter into these passage openings. The term "as a matter of priority" used above means that not all holes in the mentioned areas need be inclined in the above-described manner; rather, only some of the holes may be inclined in this fashion and other holes in this area may have a different inclination or no inclination at all with respect to the foil surface.

However, it is also advantageous to provide holes or passage openings whose longitudinal axes are inclined (and which could also be called bores), also on the side of the fuel gas inlet (or fuel gas feed) into the fuel cell if the inlet openings of these inlet-side holes (again as a matter of priority) are at least slightly oriented toward the fuel gas inlet. In the same manner, on the side of the fuel gas outflow from the fuel cell, the outlet openings of these outlet-side holes (also as a matter or priority) may be oriented at least slightly toward the fuel gas outflow (or toward the side of the fuel gas removal). This technique also helps to provide an optimized fuel gas guidance, because the fresh fuel gas can easily enter into the passage openings, and the burnt gas or the corresponding reaction products can easily exit the passage openings for the fuel gas outflow (fuel gas removal) from the fuel cell. If, in this case, the respective passage openings have longitudinal axes extending in a straight line, advantageously, the respective passage openings can meet both the conditions described in this paragraph and the conditions described in the preceding paragraph, at the same time.

However, it is also possible that holes, whose inlet opening facing away from the electrode is at least slight oriented toward the side of the fuel gas feed, and holes, whose outlet opening facing away from the electrode is at least slightly oriented toward the side of the fuel gas outlet of the fuel cell, are provided essentially alternately (side-by-side) in the foil. As a result, virtually side-by-side, reaction products can be removed from the electrode, and new fresh fuel gas can be guided to the electrode.

According to the invention, holes or passage openings whose longitudinal axes are inclined over the foil surface in a foil of a fuel cell on which an electrode of the fuel cell rests, have another advantage, specifically in regard to a special fuel cell manufacturing process. While, in the fuel cell according to the above-mentioned German Patent Document DE 43 40 153 C1, the ceramic layers of the solid-oxide fuel cells are produced individually (for example, by means of sintering green products of the respective layers—specifically the cathode, the electrolyte and the anode, it is also possible to spray the individual electrode layers successively onto metallic or ceramic substrates. Suitable thermal spraying methods can be used for this purpose, such as vacuum plasma spraying, atmospheric plasma spraying, flame spraying and others. In this case, the so-called substrate can form the carrying structure of the fuel cell, particularly in the case of vacuum-plasma-sprayed fuel cells. Porous and thus gas-permeable as well as simultaneously electrically conductive (and therefore usually metallic) materials can be used for the substrate, in order to ensure as best as possible ensure the supply of the starting material, the removal of the product and the electric current conduction within the fuel cell.

When the perforated foil is used as such a carrier substrate for the electrode layers (to which the first electrode layer is therefore applied in a pulverized manner by a thermal spraying method), if the holes are inclined with respect to the foil surface (in the case where the spraying coating process takes place at a right angle with respect to the foil or substrate surface), good powder retention can be achieved without making the diameter of the holes significantly smaller than the diameter of the drains of the electrode powder to be applied. That is, undesirable penetration of the powder grains during their thermal spraying onto the foil through the holes provided therein can be largely avoided because the longitudinal axes of the holes are inclined with respect to the foil surface.

The perforation in the foil (the holes, passage openings or bores) can be produced, for example, by means of a laser beam, an electron beam or nuclear track. However, these holes can also be formed by electrochemical methods or by masking and etching. All of the above-mentioned methods are well suited for a large-batch production. Particularly for electrode coating onto the foil by a thermal spraying method, the holes are preferably made from the side of the foil or of the substrate that is not to be coated with the electrode material. The reason is that the elevations of the hole edges forming on the coating side for the electrode material will then be helpful for a better interlocking of the ceramic electrode with the foil (or a corresponding strip).

According to an advantageous further development of the invention, the foil perforated according to the invention or a corresponding metal sheet or strip may consist of a suitable metallic material and may be combined with another structure to form an enclosure having a cavity. This additional structure also consists of a metallic material, so that this combined formation can finally form a bipolar plate of the individual fuel cell onto which (or more precisely onto its perforated foil) an electrode layer of the cathode-electrolyte-anode unit can be applied virtually directly, for example, by means of a thermal spraying method. By way of the above-mentioned cavity of this enclosure, the fuel gas or the air-oxygen can then be guided to and from the electrode. This enclosure is therefore a hollow body which preferably consists of a top shell and of a bottom shell that are preferably mutually welded together; they are generally connected in a material-locking manner, along their edges, in order to ensure a sufficient gastightness in this area.

Essentially two embodiments are possible in this case. According to a first variant, the preferably previously perforated foil can be welded as a substrate into a so-called top shell of the enclosure, which may have a rectangular, square, round or arbitrarily oval cutout. For this purpose, a corresponding foil, a strip or a metal sheet is first perforated (in a strip shape or piece by piece), and is then welded into a corresponding cutout of the top shell of a fuel cell enclosure to be produced. Such a weld seam replaces the sealing-in of the fuel cell in its bipolar plate by means of a glass solder or other ceramic or metallic glue, which is normally required in a planar solid-oxide fuel cell.

Subsequently, in the manufacturing method according to the invention, the cathode-electrolyte-anode unit can be sprayed directly onto the welded-in perforated metal foil. In this case, using a spraying mask, the anode is preferably sprayed on, almost to the weld seam between the perforated foil and the top shell. Subsequently, a larger mask is used to apply the electrolyte layer to the anode layer, so that the latter can be made gastight and can be electrically insulated. In addition, the weld seam and a small edge of the metal sheet situated around it can be sealed off by spraying by means of electrolyte material in the same operation. Then, by means of a mask, the cathode layer can be applied by spraying exactly to the surface of the anode.

According to a second embodiment, the top shell can be used directly as a carrier substrate for the anode layer to be sprayed on, in which case it has no recess. Instead, the top shell itself is perforated in the area of the anode (which is to be applied later by means of a thermal powder spraying process), so that the enclosure top shell itself is the foil perforated according to the invention. The perforation can be performed either before or after the two enclosure halves (the top and bottom halves) are welded together. The cathode-electrolyte-anode unit is then applied in the manner as described for the first embodiment. However, the sealing function of the electrolyte will be limited to the sealing-off of the porous anode layer.

In a known manner, several such enclosures can be arranged above one another to form a fuel cell stack. Each fuel cell is provided on its so-called top shell with a cathode-electrolyte-anode unit, the assembled top shell and bottom shell each operating is a bipolar plate, within which the fuel gas can be guided to the anode layer. Since it is then necessary to create a gas distribution space or flow space for the ambient air (or the air/oxygen) between the exterior of the bottom shell of a first enclosure and the top electrode layer of the second enclosure situated in the fuel cell stack below this first cassette, the exterior side of the bottom shell can be provided with a corresponding embossing structure creating such a flow space. The corresponding embossings may, for example, have a meandering structure, interrupted and laterally offset channels, an inflow zone, and much more in the flow direction and transversely to the flow direction.

Other objects, advantages and novel features of the present invention will become apparent from the following detailed description of the invention when considered in conjunction with the accompanying drawings.

BRIEF DESCRIPTION OF THE DRAWINGS

The single figure is a schematic cross-sectional view of a cassette according to a second embodiment of the invention, which forms a single solid-oxide fuel cell and can therefore be a component of a fuel cell stack.

DETAILED DESCRIPTION OF THE DRAWINGS

Referring to the figure, a metallic foil 1 represents the top shell of an enclosure 4. As illustrated, this foil 1 (which extends linearly perpendicular to the plane of the drawing) is perforated by holes 2, 2' whose longitudinal axes $2a, 2a'$ are inclined with respect to the surface of the foil 1.

Together with the bottom shell 3, the top shell or foil 1 forms the above-mentioned enclosure 4, which includes a cavity 10. A metallic wire knit or the like (not shown), can be inserted into a partial area of the cavity. The top shell 1 and the bottom shell 3 are welded to one another at their edges, so that they are material-lockingly gastightly connected with one another by a surrounding weld seam 6.

In the overlapping area with the passage openings or holes 2, 2', a cathode-electrolyte-anode unit 7 is applied to the exterior side of the top shell 1 facing away from the cavity 10, the layer resting on the foil 1 being the anode layer 7A. The latter is applied in the manufacturing process of an individual fuel cell according to the invention as a first layer by means of a thermal powder spraying method (preferably by vacuum plasma spraying). As explained above, an electrolyte layer 7E can then be applied thereto, and a cathode layer 7K can then be applied to the electrolyte layer 7E.

The fuel gas required for the fuel cell or for the electrochemical conversion process taking place therein is fed into the cavity 10 of the enclosure 4, the fuel gas feed 8Z being in the area on the left side of the cavity in the drawing, with the fuel gas removal 8A being in the area which is on the right side. Within the cavity 10, this fuel gas is appropriately distributed to the individual holes 2, 2', through which it can arrive at the anode layer 7A and react correspondingly. The removal of the reaction products also takes place by way of the holes 2 or 2" toward the fuel gas removal 8A.

Because the longitudinal axes 2a of at least some holes 2 are inclined with respect to the foil surface (for example in the area of the fuel gas feed 8Z—that is, in the fuel gas inlet area), so that the inlet opening 2b facing toward the fuel gas feed 8Z and away from the electrode 7A (preferably of the holes 2 situated close to the fuel gas inlet side) is oriented toward the fuel gas inlet 8Z, improved flow of the fuel gas into these passage openings or holes 2 is obtained. Moreover, because the outlet opening 2c facing the electrode 7A is oriented at least slightly toward the side of the fuel gas exit from the fuel cell, an improved flow against the cathode-electrolyte-anode unit is also obtained. Advantageously, these two criteria are achieved simultaneously if the passage openings or the holes 2 have a linear longitudinal axis 2a.

Holes 2' are inclined differently than the holes 2, and can be situated as a matter of priority in the area of the fuel gas removal or outlet 8A (although in the present embodiment, holes 2 and holes 2' are arranged with their described different inclinations essentially in an evenly distributed manner, and are distributed side-by-side over the surface of the foil 1). Because the longitudinal axes 2a' of the holes 2' are at least slightly inclined with respect to the foil surface, in the area of the fuel gas removal 8A (that is, in the fuel gas outlet area), the outlet opening 2b' of the holes 2' situated close to the fuel gas outlet side, which faces the fuel gas removal 8A (and thus faces away from the electrode 7A), is oriented toward the fuel gas outlet 8A. Because of such inclination of the holes 2' improved flow of burnt gas out of these passage openings or holes 2' can be achieved. Moreover, because their inlet opening 2c' facing the electrode 7A is oriented at least slightly to the side of the fuel gas inlet 8Z (=the fuel gas feed 8Z) into the fuel cell, removal of burnt gas or of the reaction products from the cathode-electrolyte-anode unit 7 is improved. In this case, these two criteria are advantageously met simultaneously if the passage openings or holes 2' have a linear longitudinal axis 2a'.

A preferred angle of inclination between the longitudinal axes 2a or 2a' of the holes 2 or 2' and the surface of the foil 1 is in the order from 45° to 75°. As mentioned above, passage openings or holes 2 whose openings 2b situated on the bottom in the figure are partially oriented toward the fuel gas feed 8Z, as a matter of priority, are provided in the area of this fuel gas feed 8Z, although a few holes 2 with a longitudinal axis 2a inclined in this manner can also be provided in the area next to the fuel gas removal 8A which is on the right side in the figure. In contrast, passage openings or holes 2', whose openings 2b' situated on the bottom in the figure are partially oriented toward the fuel gas removal 8A, as a matter of priority, are provided in the area of this fuel gas removal 8A, although a few holes 2' with a longitudinal axis 2a' inclined in this manner can also be provided in the area on the left side of the figure close to the fuel gas feed 8B. (In the figure, an alternating essentially uniformly distributed holes or passage openings 2, 2' is shown.)

As mentioned above, fuel gas is fed to or removed from the anode layer 7A of the cathode-electrolyte-anode unit 7 via the holes or passage openings 2 or 2'. So that the desired electrochemical reaction can take place on the cathode-electrolyte-anode unit 7, it is also necessary to admit oxygen to the cathode 7K. For this purpose, a certain clearance must be created when (as conventional and known) several individual fuel cells in the shape of the illustrated enclosure are stacked above one another. This can be done by providing the exterior side (in the figure, the underside of the bottom shell 3) with a corresponding embossed structure creating such a clearance. As an alternative, as illustrated in the figure, a suitable wire knit 9 or the like can be mounted (for example, soldered) on the underside 3a of the bottom shell 3. Through the above-mentioned embossings or through this wire knit 9, air-oxygen can then reach the cathode (7K) of an individual fuel cell or enclosure situated in a fuel stack (not shown), below the individual fuel cell or enclosure 4 illustrated in the figure.

The individual fuel cells arranged above one another in a fuel cell stack are connected to one another in an electrically intimate manner in order to minimize the ohmic losses in this stack. In this sense, the above-mentioned metallic wire knit 9 is also particularly advantageous. Also in this sense, the two enclosure shells (top shell 1 and the bottom shell 3) should be mutually well contacted electrically, for example by means of the above-mentioned weld seam 6. For this purpose, the latter can extend in the concerned surface along a meandering path.

A fuel cell according to the invention is distinguished by optimized material transport afforded by the construction of the holes 2, 2', which enhances the efficiency of the fuel cell. Furthermore, a simple production is also conceivable for a large batch series. The evenness of the application surface for the anode layer 7A, which is considerably improved as a result of the use of the suggested foil 1, permits the reaction of smaller thicknesses of the ceramic reaction layers (that is, the cathode-electrolyte-anode unit 7) and thus a lower consumption of material as well as lower reaction losses because of shorter and optimized transport paths. Also with respect to the contact layer to the cathode 7K, which is implemented by the wire knit 9, lower ohmic losses and lower transport resistances will then be obtained. On the whole, as a result of improved electrical transverse and longitudinal conductance of the substrate (that is, of the foil), the chemical processes in the fuel cell can be improved and the ohmic losses in the enclosure 4 can be reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Fuel cell comprising:
   a cathode-electrolyte-anode unit; and
   a structure which distributes fuel gas over an electrode surface of said cathode-electrolyte-anode unit; wherein,
   a surface of said structure which faces the electrode comprises a perforated foil; and longitudinal axes of at least some holes which perforate said foil are inclined with respect to the foil surface, wherein:

the longitudinal axes of at least some of the holes are inclined differently with respect to the foil surface;

in an area of a fuel gas feed into the fuel cell, outlet openings of holes facing the electrode, as a matter of priority, are at least slightly oriented toward a fuel gas outlet from the fuel cell; and in an area of a fuel gas outlet from the fuel cell, inlet openings of holes facing the electrode, as a matter of priority, are at least slightly oriented toward the fuel gas feed into the fuel cell.

2. The fuel cell according to claim 1, wherein:

in an area of the fuel gas feed into the fuel cell, inlet openings of the holes facing away from the electrode, as a matter of priority, are oriented toward the fuel gas inlet; and in the area of the fuel gas outlet from the fuel cell, outlet openings of the holes facing away from the electrode, as a matter of priority, are oriented toward the fuel gas outlet.

3. The fuel cell according to claim 2, wherein holes whose inlet openings facing away from the electrode are at least slightly oriented toward the area of the fuel gas feed, and holes whose outlet openings facing away from the electrode are at least slightly oriented toward the area of the fuel gas outlet of the fuel cell, are arranged alternately side-by-side in the foil.

4. The fuel cell according to claim 3, wherein the holes in the foil are produced by one of a laser beam, an electron beam, a nuclear track and an electrochemical method.

5. The fuel cell according to claim 4, wherein the electrode material in the form of ceramic layers is applied by a thermal spraying method essentially perpendicularly to a surface of the foil.

* * * * *